United States Patent Office 3,057,990
Patented Oct. 9, 1962

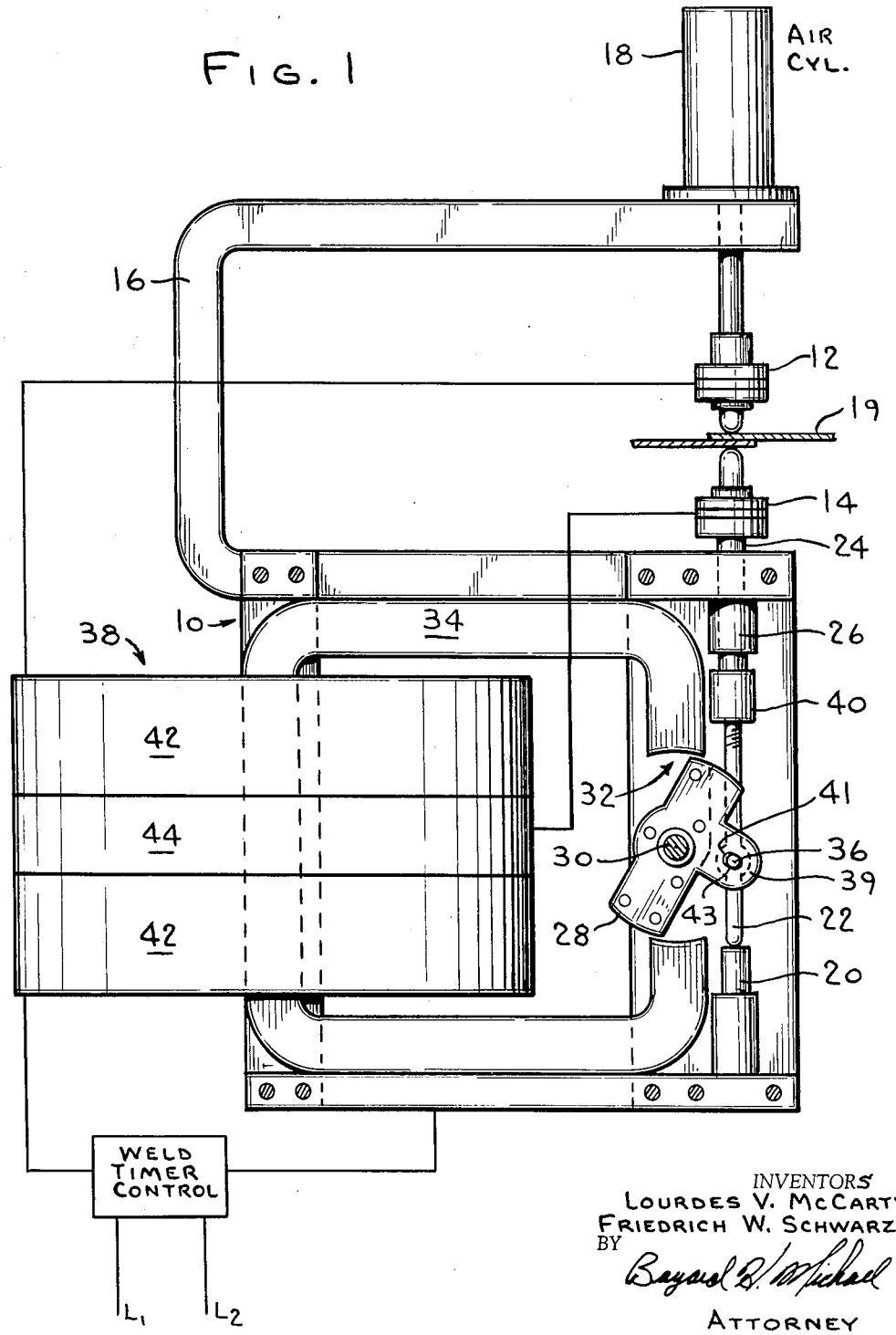

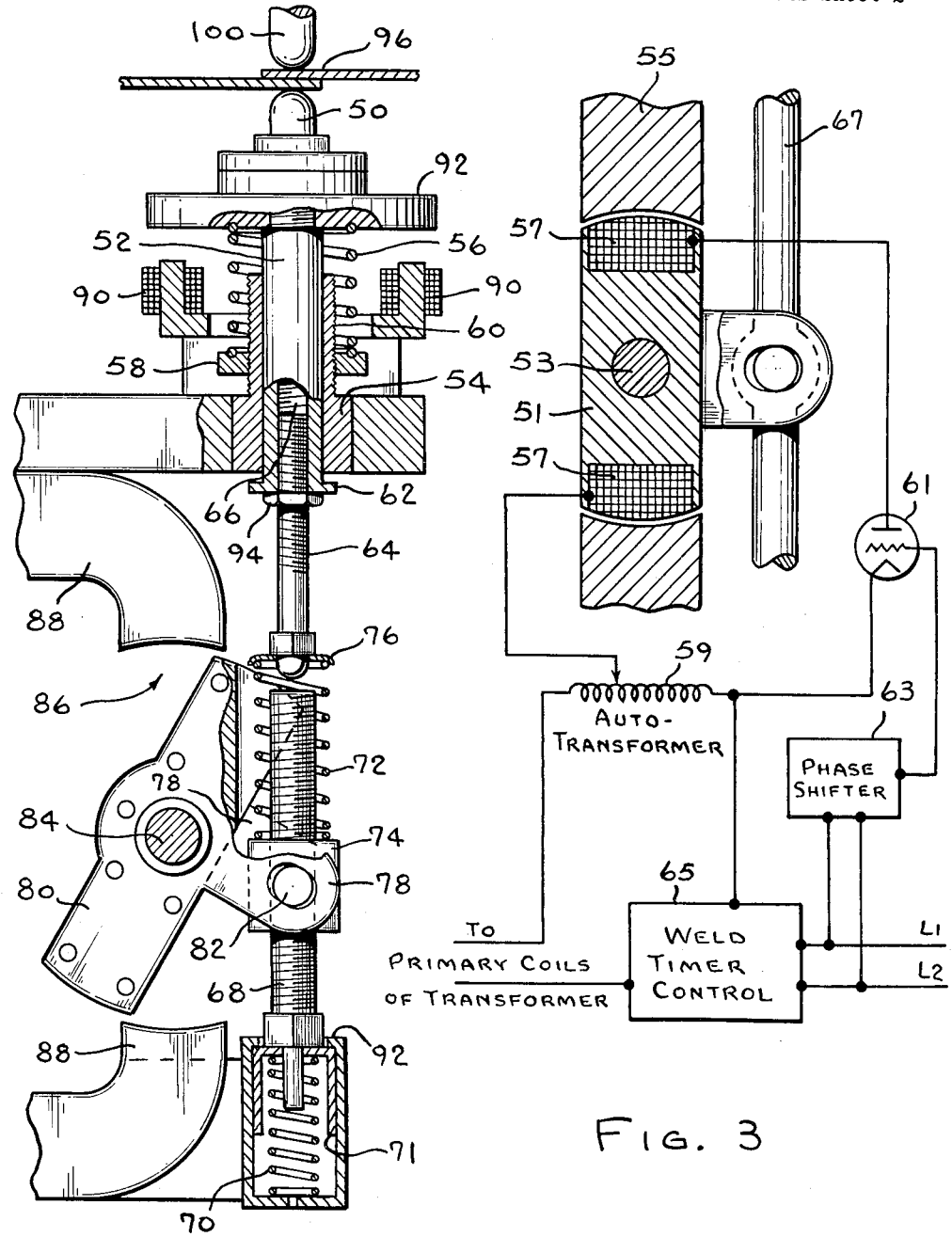

3,057,990
ROTARY MAGNETIC FORCE WELDER
Lourdes V. McCarty, Milwaukee, Wis., and Friedrich W. Schwarz, Phoenix, Ariz., assignors to Controls Company of America, Schiller Park, Ill., a corporation of Delaware
Filed July 22, 1960, Ser. No. 44,721
16 Claims. (Cl. 219—86)

This invention relates to a magnetic type resistance welding machine.

In the field of resistance welding, the use of magnetic force in the follow-up of the electrical impulse has become increasingly important due to the increasing variations in the type and thickness of material. Systems which are presently being used are confronted with the problem of reducing the mass that is used to impart the required pressure.

The primary object of the present invention is to provide an improved resistance welding machine.

Another object is to incorporate delayed forge welding techniques into an improved resistance welding machine without reducing the speed of response.

A further object is to provide a small, compact type welding machine which results in a reduction in the size of the frame.

Still another object of the present invention is to provide a magnetic type resistance welding machine having a variable magnetic force and time delay control.

Time delay in the application of the force is obtained through a mechanical lost-motion connection or through an electrical delay circuit. In either of these systems, a close control of the timing is essential to the production of a good weld.

Another object is to provide an improved electrical circuit for controlling the pressure in an electrical delay system.

Other objects and advantages will be pointed out in, or be apparent from, the specification and claims, as will obvious modifications of the several embodiments shown in the drawings, in which:

FIG. 1 is a side elevation of the present invention showing the armature in position to deliver the forging blow.

FIG. 2 is a side elevation partly in section of the magnetic force mechanism in a modified arrangement of the invention.

FIG. 3 is a schematic showing of a modified armature for imparting the forging pressure.

Referring to the drawings, particularly FIG. 1, the magnetic force welding machine includes main frame 10 supporting a pair of electrodes 12 and 14 in a vertical relationship in a U-shaped member 16. Upper electrode 12 is movable from an upper position to an operative position by the actuation of air cylinder 18 and is locked when in the operative position to clamp workpiece 19 between the electrodes. Lower electrode 14 is mounted on shaft 24 in guideway or bushing 26 and is biased into engagement with the workpiece by a spring biased or hydraulical actuated cylinder 20 through connecting rod 22. A nut 40 is secured to the lower end of shaft 24 to receive the upper end of the connecting rod so that the vertical position of the connecting rod can be adjusted.

Pressure is applied to the workpiece by the motor action of armature 28 rotatably positioned on shaft 30 in air gap 32 provided in magnetic core 34 of transformer 38. The connecting rod is connected to the armature by inserting pin 36 through hole 41 in flanges 39 and hole 43 in the connecting rod. In a D.C. motor the torque available at the armature is dependent on the angular position of the armature in the air gap of the magnetic core. The torque is zero when the armature is in line with the magnetic core and increases as the armature is rotated out of line with the magnetic flux in the air gap, reaching a maximum when rotated to the position shown approximately in FIG. 1.

When the primary 42 of the transformer is energized, the armature will tend to rotate to an in-line position with the magnetic core, and the force is transmitted to the electrode by the connecting rod. This force can be varied by rotating nut 40 to change the vertical position of the connecting rod, which will change the angular position of the armature in the air gap of the magnetic core.

In operation, electrode 12 is raised by actuating air cylinder 18 and the workpieces placed between the electrodes. Electrode 12 is then lowered and locked to clamp the workpieces between the electrodes with cylinder 20 providing a prepressure between the electrodes. The current required to weld the particular type and thickness of material is determined, and the armature is positioned for the desired pressure and follow-up action by rotating adjusting nut 40 to set the angular position of the armature in the air gap. The primary 42 of the transformer is energized, generating a welding current in the secondary 44, and simultaneously increasing the flux density across the air gap in the magnetic core so that the armature tends to rotate to an in-line position producing a magnetically induced pressure and follow-up action on the workpieces. Since the armature tends to rotate in response to an increase in the flux density across the air gap of the magnetic core, the pressure on the workpieces will be constant throughout the welding operation. After the transformer has been de-energized, the upper electrode is raised by the air cylinder, so that the workpieces can be removed from the electrodes.

The above system provides the pressure for the weld from the motor action of an armature, thereby eliminating the necessity of moving a large mass of material and the problems incident to accelerating a large mass. It should be obvious that the frame required for the present welder may be made of a relatively lighter structure. This device also provides a closer control on the delivery of the pressure to the weld at the proper time, as well as maintaining the pressure on the work throughout the welding operation.

In the structure shown in FIG. 2, the connecting rod for the forging electrode has been modified to provide a time delay in the delivery of the pressure to obtain a delayed forge action. The electrode 50 is mounted on shaft 52 which is slidable in guideway 54. The electrode is biased upward by spring 56, seated on adjusting nut 58 on external thread 60 of the guideway. Flange 62 is provided on the lower end of shaft 52 to limit the upward motion of electrode 50. The connecting rod includes pin 64 threaded into aperture 66 in shaft 52 and screw 68 positioned on spring biased cylinder 71. The pin and screw are separated by spring 72 seated on adjusting nut 74 and acting on plate 76 on the lower end of the pin. Spring 72 holds the screw in a vertical position in alignment with the pin. The adjusting nut 74 is connected to the flanges 78 of armature 80 by pin 82 so that it is held from rotation and will move up or down depending on the direction that the screw is rotated. Armature 80 is pivoted on shaft 84 for rotation in air gap 86 of magnetic core 88 as described above. The gap between the pin and screw provides a lost motion action during the initial movement of the armature, and when the screw contacts the pin it will impart a forging blow to the lower electrode 50. The forging pressure can be adjusted by rotating screw 68 to set the angular position of the armature in the air gap of the magnetic core. The upper electrode 100 is shown as a stationary member with a magnetic core 90 positioned below a permeable flange 92 on electrode 50. This arrangement is shown as an alternative to the air cylinder shown in FIG. 1. Either may be used with the apparatus shown in FIGS. 1 and 2.

In operation, electrode 50 is lowered by energizing magnetic core 90 which attracts permeable flange 92 secured to the electrode, pulling the electrode downward against the bias of springs 56, 70 and 72. Workpiece 96 is then inserted between the electrodes, and core 90 de-energized. Springs 56 and 72 will force the electrode upward, clamping the workpiece between the electrodes and spring 70 will move screw 68 up until cylinder 71 abuts flange 92. The initial pressure on the workpiece is set by adjusting nut 58 on thread 60. The desired time delay is set by adjusting pin 64 in the shaft to provide the desired gap and locking the pin in the shaft by tightening nut 94. Screw 68 is rotated until the armature has reached the required angular position in the air gap to produce the desired forging pressure.

When the transformer is energized, the secondary will generate the welding current across the electrodes, while the primary increases the magnetic flux in the air gap causing the armature to rotate counterclockwise. The armature will rotate until screw 68 strikes pin 64, causing a forging action at the weld. This delay in the delivery of the forging pressure will allow the current across the electrodes to initiate the weld before the forging pressure is applied. The electrode will be held against the workpiece until the transformer is de-energized (frequently one-half cycle), allowing spring 72 to force the armature and screw back to their original position.

In FIG. 3 a circuit arrangement is shown for effecting an electrical time delay in delivering the forging pressure to the weld. The welding frame is structurally similar to the device shown in FIG. 1 but includes an armature 51 that is pivoted on shaft 53 in the air gap of magnetic core 55 and is wound with coils 57. The armature is aligned with the magnetic core so that the torque is zero when the transformer is energized. When the armature of an electric motor is aligned in the magnetic field of a magnet, the armature will remain stationary, but when a current is set up in the coils of the armature, the armature will tend to rotate. This tendency to rotate can be regulated by adjusting the current through the coils. The armature coils 57 of this modification are connected to auto transformer 59, which can be adjusted to vary the pressure imparted by the armature. Time-delay is accomplished by thyratron 61 connected to the coils 57 and to phase shifter 63 which is connected across the lines L1, L2. When the weld timer control 65 is energized to energize the transformer and generate a welding current across the electrodes, the thyratron will delay the energization of the coils 57 until it is fired by the phase shifter. The armature will tend to rotate depending on the current in the coils delivering a forging pressure through connecting rod 67 to the electrodes.

This arrangement provides a close control between the delivery of the welding current and the delivery of the forging pressure. The auto transformer and phase shifter provide an easy means for varying the forging pressure and the length of time delay in delivering the forging blow to the weld. In each of the three modifications shown, the means of obtaining the desired pressure is through a motor action.

Although but a few embodiments of the present invention have been illustrated and described, it will be apparent to those skilled in the art that various changes and modifications may be made therein without departing from the spirit of the invention or from the scope of the appended claims.

We claim:

1. A magnetic force welding machine comprising, a pair of electrodes, means for generating a welding current across the electrodes, said generating means including a magnetic core having an air gap therein, and rotary means positioned in the air gap for imparting pressure to the electrodes when the generating means generates the welding current across the electrodes.

2. A welding machine according to claim 1 wherein the means positioned in the air gap comprises, an armature positioned to rotate in the air gap and being operatively connected to an electrode, said armature tending to rotate in response to energization of the magnetic core, the force being transferred to the electrodes.

3. A welding machine according to claim 2 including means for adjusting the angular relation of the armature in the air gap to provide a predetermined pressure on the electrode when the core is energized.

4. A welding machine according to claim 3 including a lost-motion means for delaying the delivery of the forging pressure to the electrodes.

5. A welding machine according to claim 1 including a number of coils wound on the armature and an electric circuit for delaying the delivery of current to the armature with respect to the energization of the welding cycle, thereby providing a time delay in the delivery of the pressure to the electrodes.

6. A magnetic force welding machine comprising, a pair of electrodes, means for generating a welding current across the electrodes, and electro-magnetic means for imparting a forging pressure to the electrodes simultaneously with the generation of the welding current across the electrodes, said electro-magnetic means including an armature which tends to rotate on energization of the generating means, and means connecting the armature to the electrodes.

7. A welding machine according to claim 6 including means for delaying the delivery of the forging pressure to the electrodes.

8. A welding machine according to claim 7 wherein the delaying means comprises a lost-motion means in the connecting means.

9. A welding machine according to claim 7 wherein the delaying means comprises an electrical delay circuit connected to the armature.

10. The combination with a magnetic force welding machine having a transformer for generating a welding current across a pair of electrodes, of means for applying forging pressure to the electrodes comprising, means for moving one of the electrodes into operative relationship with the other electrode, and means connected to the transformer for applying forging pressure to the electrodes on energization of the transformer, said means for moving one of the electrodes including rotary motor means operatively connected to the moving means to impart a forging pressure to the electrodes.

11. The combination of claim 10 including means for delaying the application of the forging pressure until after a welding current has been established across the electrodes.

12. The combination of claim 11 wherein the delaying means comprises a lost-motion connection in the moving means.

13. The combination of claim 11 wherein the delaying means comprises an electrical delay circuit connected to the motor means.

14. A magnetic force welding machine comprising, an electro-magnetic frame, including a pair of electrodes, means for energizing the frame, a rotary armature mounted in the frame, means connecting the armature to one of the electrodes, means for adjusting the angular relation of the armature with respect to the frame to vary the initial force available at the armature when the frame is energized, the initial force available at the armature when the frame is energized being transmitted to the electrodes to produce a forging pressure between the electrodes.

15. A welding machine according to claim 14 wherein the connecting means includes a lost-motion connection to delay the delivery of the armature force to the electrodes.

16. A magnetic force welding machine comprising, a frame supporting a pair of electrodes, means for energizing the electrodes, rotary motor means for imparting a forging pressure to the electrodes, and circuit means connecting the electrode energizing means to the motor means and including an electrical time delay circuit for delaying the application of the forging pressure.

References Cited in the file of this patent

UNITED STATES PATENTS

| | | |
|---|---|---|
| 2,401,528 | Vang | June 4, 1946 |
| 2,459,796 | Dawson | Jan. 25, 1949 |
| 2,464,967 | Dinnick | Mar. 22, 1949 |